INVENTOR
Harry Vogeli

United States Patent Office 2,880,844
Patented Apr. 7, 1959

2,880,844
MECHANISM FOR HANDLING ELONGATED ARTICLES

Harry Vogeli, Alliance, Ohio, assignor to Salem-Brosius, Inc., Carnegie, Pa., a corporation of Pennsylvania Application October 19, 1956, Serial No. 617,136

3 Claims. (Cl. 198—26)

This invention relates to mechanism for handling elongated articles. The invention is especially well adapted for the handling of elongated articles which move sequentially down an inclined bed. For purposes of explanation and illustration the invention will be described as embodied in mechanism for handling generally cylindrical elongated articles adapted to roll one after another by gravity down the inclined bed of a heating furnace in which the articles are heated. Such generally cylindrical elongated articles may be bars, pipes, tubes or other articles capable of being handled in the manner to be described. For simplicity the articles will be referred to as pipes in the description of the illustrated embodiment of the invention.

In inclined bed ("roll-down") pipe heating furnaces, as known to those skilled in the art prior to my invention, pipes were delivered one after the other longitudinally along a conveyor and each pipe as it reached a position opposite the inclined bed of the furnace was manually discharged sidewise from the conveyor onto the furnace bed. The pipe rolled slowly down the inclined bed of the furnace while being heated, the pipe being in contact with other pipes below and above it as it rolled down the inclined bed, movement of the pipes down the inclined bed being caused by gravity. At the lower end of the inclined bed the pipes were manually delivered one by one from the bed onto a conveyor similar to the conveyor on which the pipes were delivered to the furnace. On the second conveyor the pipes were delivered away for further processing.

The manual delivery of the pipes onto the inclined bed required two men and the manual delivery of the pipes from the inclined bed required two men or a total of four men simply to move the pipes onto and off of the inclined bed of the heating furnace. I provide mechanism for performing mechanically and automatically the operations above described which have heretofore been performed manually, effecting a substantial saving in labor cost, eliminating the human element of error and also eliminating the hazard of injury to the workmen in handling the moving hot pipes.

I provide mechanism for handling elongated articles comprising a guideway along which elongated articles are adapted to move endwise following one another, an inclined bed beside the guideway with its high side adjacent the guideway down which elongated articles are adapted to move sidewise following one another, a plurality of ejectors mounted in spaced relation along the guideway and means for simultaneously operating the ejectors to eject an elongated article from the guideway onto the bed. The guideway may comprise a series of aligned rollers and the ejectors may be mounted in spaced relation in between the rollers. I preferably provide control means actuated by an elongated article in movement along the guideway and means actuated by the control means for simultaneously operating the ejectors to eject an elongated article from the guideway onto the bed.

The ejectors are preferably disposed generally in the vertical plane of the guideway and are preferably mounted to turn about axes extending transversely of the guideway. Each ejector preferably has an ejecting portion which when operative in relation to an elongated article is inclined to the horizontal. Means are preferably provided for simultaneously turning the ejectors about said transverse axes whereby the ejectors raise an elongated article from the guideway and deliver it generally laterally onto the bed. Desirably the ejectors are made to turn about their axes in movement from inoperative position to operative position in relation to an elongated article so that as they engage the elongated article the ejecting portions thereof are moved generally in the direction of movement of the elongated article and at comparable speed. Thus relative longitudinal movement between the ejectors and the elongated articles is minimized which largely eliminates scratching of the pipe by the ejectors.

I also provide mechanism for handling elongated articles comprising an inclined bed, a first guideway along the high side of the bed, a second guideway along the low side of the bed, means actuated by an elongated article in its movement along the first guideway ejecting the elongated article from the first guideway onto the bed and means ejecting the elongated articles one by one from the bed onto the second guideway. Such ejecting of the elongated articles one by one from the bed onto the second guideway may be controlled by movement of the articles along the second guideway so that as each article moves out of range the succeeding article is automatically ejected from the bed onto the second guideway.

Other details, objects and advantages of the invention will become apparent as the following description of a present preferred embodiment thereof proceeds.

In the accompanying drawings I have shown a present preferred embodiment of the invention in which—

Figure 1:
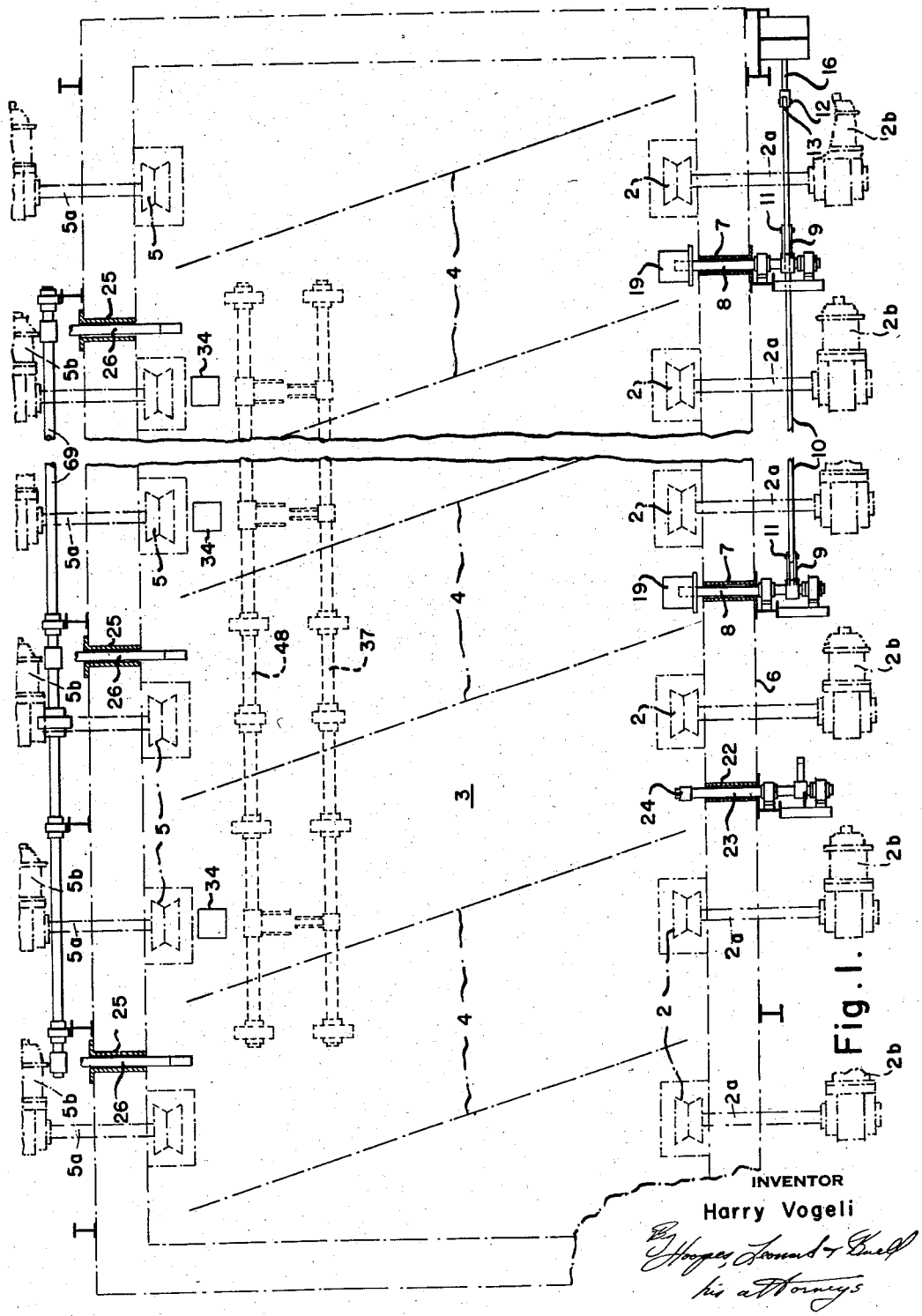
Figure 1 is a fragmentary diagrammatic plan view, with portions omitted for clarity and portions in horizontal cross section, of mechanism for handling pipes onto and off of the inclined bed of a so-called roll-down pipe heating furnace.

Referring now more particularly to the drawings, pipes are fed longitudinally following one another from right to left viewing Figure 1 along a roller conveyor made up of spaced apart rollers 2 mounted on shafts 2a driven by motors 2b and are ejected one by one from that conveyor onto the inclined bed of the furnace, which bed is not shown in detail since it may be conventional but is indicated diagrammatically at 3. The inclined bed may consist of a plurality of generally parallel rails whose center lines are designated by the chain lines 4 in Figure 1. Desirably the rails are inclined to the direction in which the pipes roll down the bed under the action of gravity so that a rail will not act on a single localized circumferential zone of a pipe as the pipe rolls down the bed. As the pipes roll down the bed they are in contact with one another and the delivery or ejection of the lowermost pipe from the bed provides space at the lower extremity of the bed for the following pipe to move down, and the pipes above it move consonantly. The pipes are delivered one by one from the low side of the bed 3 onto a roller conveyor comprising spaced apart rollers 5 mounted on shafts 5a driven by motors 5b, which conveyor may be similar in construction and operation to the conveyor at the high side of the bed. As mentioned above, prior to the present invention the pipes were delivered from the upper conveyor to the bed and from the bed to the lower conveyor manually, i.e., by workmen standing at appropriate working stations and moving the pipes by the hand manipulation of suitable tools functioning much in the nature of crow bars. The work was difficult and the conditions uncomfortable due to the heat of the furnace and of the pipes being handled, particularly at the low side of the inclined bed. Considerable skill and dexterity were required to eject the pipes moving at considerable speed along the upper conveyor onto the bed. The labor cost for such a comparatively trivial operation in relation to the entire pipe manufacturing operation was high. Danger existed of injury to the workmen.

I provide means for ejecting the pipes moving from right to left viewing Figure 1 along the roller conveyor 2 onto the inclined bed 3, such ejection of the pipes being accomplished mechanically and automatically and without the need of any labor. Suitably mounted in the framework 6 of the furnace and extending transversely of the conveyor 2 and in between the rolls of that conveyor although slightly to one side thereof is a series of spaced apart bearing sleeves 7. Journalled in each of the bearing sleeves 7 is a shaft 8. Each of the shafts 8 has fastened thereto at its outer end an arm 9. The arms 9 are connected together for simultaneous operation by a compound link 10 pivoted to the respective arms 9 at 11. The compound link 10 projects to the right of the right-hand arm 9 viewing Figure 2 where it is pivoted at 12 to a lever 13 fulcrumed at 14 in the furnace framework and at its other end pivoted at 15 to the piston rod 16 of a piston in a cylinder 17 mounted in the framework upon trunnions 18.

Figure 2:
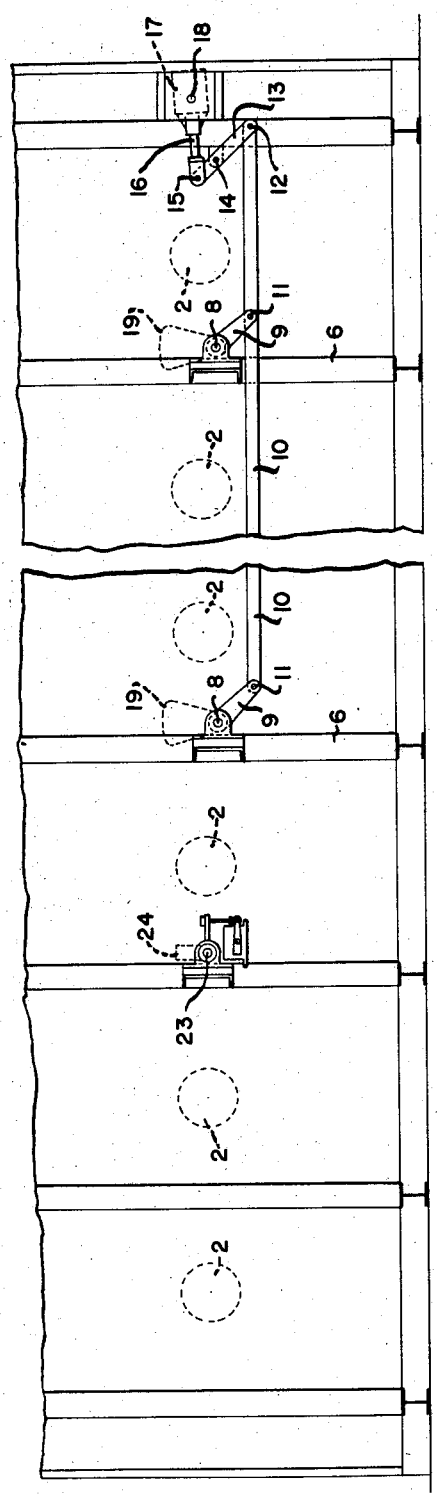
Figure 2 is a fragmentary diagrammatic elevational view of a portion of the mechanism shown in Figure 1.
Figure 3:
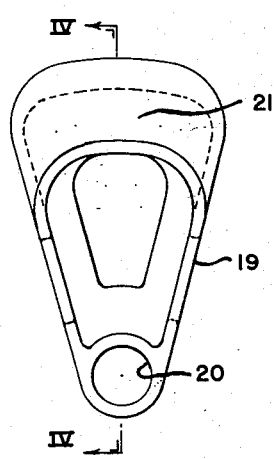
Figure 3 is an enlarged view of one of the ejectors for ejecting pipes from the conveyor at the high side of the inclined bed onto the bed.
Figure 4:
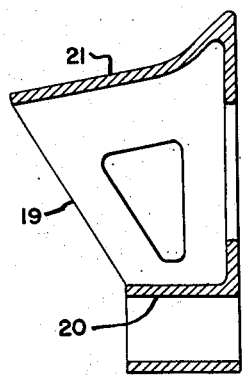
Figure 4 is a cross-sectional view taken on the line IV—IV of Figure 3.

At its inner end each of the shafts 8 carries an ejector 19 shown in detail in Figures 3 and 4. Each ejector 19 has a bore 20 which receives the inner end of the corresponding shaft 8, and the ejector is fastened to the shaft by being keyed thereto or otherwise so that the ejector turns with the shaft. The ejector projects generally in one radial direction from the shaft and has a surface portion 21 which when it is in operative position in relation to a pipe being ejected is inclined to the horizontal as shown in Figure 4. The ejectors 19 are in the same vertical plane as the rollers 2 and when the ejectors are in upright position as shown in Figure 2 the inclined surface portions 21 thereof are somewhat above the tops of the rollers 2. On the other hand when the shafts 8 are turned in the clockwise direction relative to the position in which they are shown in Figure 2 through an angle of approximately 60° the ejectors 19 are disposed entirely below the path of pipes advancing on the conveyor 2 and are inoperative.

Mounted in the framework of the furnace in a bearing sleeve 22 is a shaft 23 carrying at its outer extremity a trip arm 24 adapted to project upwardly into the path of pipes moving along the conveyor 2. The shaft 23 is connected with control mechanism (not shown) which may be of conventional type functioning as will be described below. The shaft 23 is spring operated to the position of Figures 1 and 2 in which the trip arm 24 is upright, the shaft being turnable against the action of the spring as the trip arm is forced toward the left by a pipe moving from right to left on the conveyor 2. The shaft is by the pipe passing over the depressed trip arm maintained in the position to which it is turned until the pipe has been ejected from the conveyor 2 whereupon it is returned by the spring to its original position with the trip arm 24 upright.

The rollers 2 are preferably constantly driven to advance pipes following one another from right to left viewing Figure 1. As the forward end of a pipe engages the trip arm 24 it turns the shaft 23 against the action of the above mentioned spring and through the control mechanism causes fluid under pressure to enter the cylinder 17 to the right of the piston therein moving the piston toward the left to the position of Figure 2 and moving the ejectors 19 upwardly about the axes of their shafts 18 from inoperative to operative positions. The ejectors collectively raise the pipe up out of the conveyor 2 so that for a moment the pipe is supported on the inclined surface portions 21 of the ejectors. The pipe immediately rolls down the inclined surface portions 21 of the ejectors onto the bed 3. Ejection of the pipe allows the spring to return the shaft 23 and the trip arm 24 to normal position which through the control mechanism causes fluid under pressure to enter the cylinder 17 to the left of the piston, the fluid to the right of the piston being discharged. Thereupon the ejectors 19 are moved to inoperative position in readiness for the succeeding cycle of operations caused by the next pipe reaching and operating the trip arm 24.

The pipes as mentioned above roll down the inclined bed 3 due to the force of gravity, the pipes being in contact with each other during such rolling. I provide for automatic mechanical ejection of the pipes one by one from the bottom of bed 3 to the conveyor 5 whereon they are conveyed away longitudinally one after another.

Figure 5:
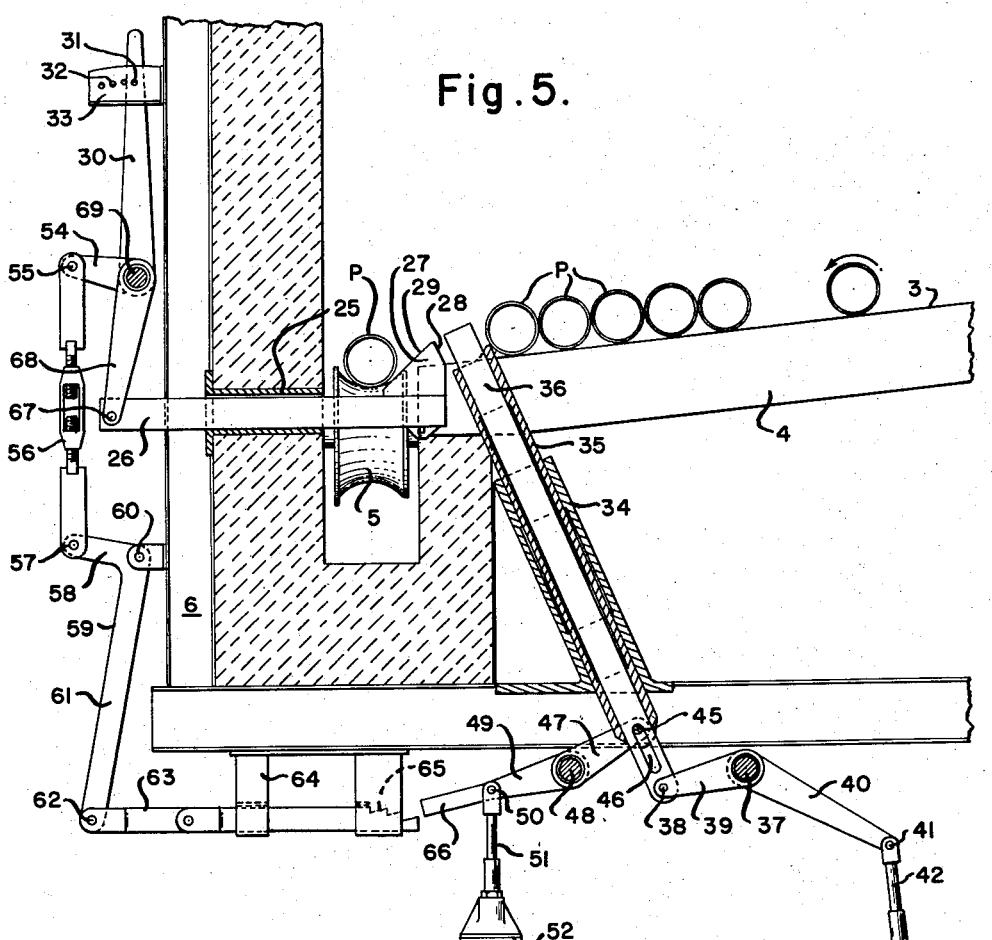
Figure 5 is an enlarged vertical transverse cross-sectional view illustrating the mechanism for ejecting pipes from the low side of the bed onto the conveyor adjacent the low side of the bed.

A series of spaced apart bearing sleeves 25 are mounted in the furnace framework, such sleeves extending transversely of the conveyor 5 and in between the rolls of that conveyor although slightly to one side thereof as shown in Figures 1 and 5. Slidably mounted in each bearing sleeve 25 is a rod 26 carrying at its inner end upwardly projecting limiting means in the form of a bumper 27 adapted normally to limit the extent to which the pipes, designated by P, can roll down the bed 3. Each bumper 27 has a pipe engaging surface 28 and an opposed downwardly inclined surface 29. Means presently to be described are provided for raising the pipes from the bottom of the bed 3 and discharging them over top the bumpers 27 into the roller conveyor 5. Any suitable number of the bumpers 27 may be provided, three being shown in Figure 1. The bumpers 27 slightly overlap in a direction longitudinally of the furnace the lower extremities of the rails 4 forming the inclined bed 3 (see Figure 5) so that when a pipe P is in engagement with the surfaces 28 of the bumpers it is at the same time resting on the bed while when the pipe is projected over top the bumpers it rolls down the surfaces 29 of the bumpers into the conveyor 5 beyond the ends of the rails.

Provision is made for moving the bumpers 27 horizontally toward and away from the bed 3 by sliding the rods within the bearing sleeves 25. Each rod 26 is pivoted at 67 to an arm 68 fixed to a longitudinal shaft 69. Also fixed to the shaft 69 is a handle 30. The handle 30 may be turned through a small angle to adjusted positions and fastened in those positions by a pin 31 carried by the handle and entering a selected hole 32 in a plate 33 carried by the supporting framework. Thus by adjustment of the position of the handle 30 the position of the bumpers 27 in the right and left direction viewing Figure 5 may be adjusted. The bumpers are adjusted in consonance with the diameter of the pipes being handled. For relatively large diameter pipes the bumpers are withdrawn toward the left viewing Figure 5 while for relatively small diameter pipes they are projected toward the right.

The supporting framework carries a plurality of upwardly inclined tubular guides 34, four such guides preferably being employed, the guides being disposed in between the rails of the inclined bed 3 and below the bed.

They are inclined upwardly and toward the lower side of the bed as shown in Figure 5.

Slidably mounted within each guide 34 is a tube 35. Slidably mounted within each tube 35 is a rod 36. The guides 34, tubes 35 and rods 36 may be either circular or non-circular in cross-section so long as they are conformably shaped so that each guide 34 guides its tube 35 and each tube 35 guides the corresponding rod 36. I find it most satisfactory to make the tubes, guides and rods of square cross-section.

Mounted in the supporting framework and extending longitudinally of the furnace is a shaft 37. Connected with each rod 36 at 38 and fastened to the shaft 37 is an arm 39. The rod 36 is moved up and down within the corresponding tube 35 by turning of the shaft 37. Some lost motion must be provided for by reason of the change in angularity of the arms 39. Either the connection 38 may be a loose pivotal connection or the rod 36 may be somewhat smaller than the tube 35 so that its angularity within the tube may change slightly, or both. An arm 40 is connected with the shaft 37, the outer end of the arm 40 being pivoted at 41 to the piston rod 42 of a piston in a cylinder 43 mounted in the supporting framework upon trunnions 44. Movement of the piston in the cylinder 43 causes projection and retraction of the rods 36.

A pin 45 is carried by each tube 35 and passes freely through a slot 46 in the corresponding rod 36, each such pin 45 extending outwardly of the tube and being pivotally connected with an arm 47 fastened to a longitudinal shaft 48 mounted in the framework. Turning of the shaft 48 causes projection and retraction of the tubes 35. Here again due to change in angularity of the arms 47 lost motion must be provided for either at the pivotal connections between the arms 47 and the tube or between the tube and the guide 34.

Fastened to the shaft 48 is an arm 49. Pivoted to the arm 49 at 50 is the piston rod 51 of a piston in a cylinder 52 mounted in the supporting framework on trunnions 53. Movement of the piston in the cylinder 52 advances and retracts the tubes 35.

Fastened to the shaft 69 is an arm 54 which is pivoted at 55 to an adjustable link 56 which in turn is pivoted at 57 to an arm 58 of a bell crank lever 59. The bell crank lever 59 is pivoted to the framework at 60, the other arm 61 thereof being pivoted at 62 to a slide 63 slidable horizontally in a guide 64 in the same transverse vertical plane with the arm 49. The right-hand extremity of the slide 63 is stepped as shown at 65, the steps being adapted to serve as stop or limiting means with respect to a projection 66 forming an integral part of the arm 49. The steps determine the extent to which the tubes 35 may be projected upwardly by the piston in the cylinder 52. The farther to the right the slide 63 is the higher will be the step 65 positioned under the extremity of the extension 66 and the greater will be the restraint against upward projection of the tubes 35. But through the linkage shown the bumpers 27 and the slide 63 both move to the right when the handle 30 is swung to the left viewing Figure 5 and both move to the left when the handle 30 is swung to the right. As explained above the bumpers 27 are moved to the right viewing Figure 5 when relatively small diameter pipes are being handled. Due to the linkage shown the tubes 35 are projected upwardly to a less extent when relatively small diameter pipes are being handled than when relatively large diameter pipes are being handled. This is to insure proper functioning of the tubes 35 with respect to each size of pipe.

A description of a cycle of the mechanism for discharging pipes from the lower side of the inclined bed 3 into the conveyor 5 will now be given. At the beginning of the cycle a pipe is being conveyed away on the conveyor 5, another pipe is against the surfaces 28 of the bumpers 27 and other pipes are in contact with that pipe on the inclined bed 3. The tubes 35 and rods 36 are withdrawn downwardly, the pistons in the cylinders 43 and 52 being at the upper ends of their strokes viewing Figure 5. The handle 30 is positioned appropriately for the diameter of pipe being handled.

As the pipe being conveyed away in the conveyor 5 reaches or approaches the position in which it will clear the portion of the conveyor opposite the pipe lying against the bumpers 27 the pipe in the conveyor trips a limit switch which is outside the field of the patent drawings and may be of any well-known type. Operation of the limit switch causes opening of a valve admitting fluid under pressure above the pistons in the cylinders 43 and 52 forcing those pistons downwardly viewing Figure 5 and moving upwardly the tubes 35 and rods 36. The rods 36 push the pipe which is against the bumpers 27 over top of the bumpers and that pipe rides down the surfaces 29 onto the conveyor 5. While that pipe is being pushed over the bumpers 27 by the rods 36 the tubes 35 prevent the pipes on the inclined bed 3 from moving downwardly. After the pipe has been pushed over the bumpers 27 the pressure in the cylinders 43 and 52 is reversed and the pistons are moved upwardly therein, withdrawing downwardly the rods 36 and tubes 35. This permits the pipes on the inclined bed 3 to roll downwardly until the lowermost pipe comes to rest against the bumpers 27, terminating the cycle.

While I have shown and described a present preferred embodiment of the invention it is to be distinctly understood that the invention is not limited thereto but may be otherwise variously embodied within the scope of the following claims.

I claim:

1. Mechanism for handling elongated articles comprising an inclined bed, a guideway along the low side of the bed toward which elongated articles on the inclined bed tend to gravitate, limiting means operatively interposed between the inclined bed and the guideway limiting the extent to which the elongated articles can gravitate toward the guideway, means comprising an ejector adapted to act on an elongated article next the limiting means to move the elongated article past the limiting means into the guideway and means comprising a generally tubular member disposed about at least a portion of the ejector adapted to advance to operative position and in such position hold back other elongated articles on the bed until the ejector has moved the first mentioned elongated article past the limiting means.

2. Mechanism for handling elongated articles comprising an inclined bed, a guideway along the low side of the bed toward which elongated articles on the inclined bed tend to gravitate, limiting means operatively interposed between the inclined bed and the guideway limiting the extent to which the elongated articles can gravitate toward the guideway, means for moving the limiting means relatively to the guideway to properly position the limiting means in relation to the transverse dimension of the elongated articles being handled so that the greater such transverse dimension the closer to the guideway the limiting means will be, means adapted to act on an elongated article next the limiting means to move the elongated article past the limiting means into the guideway, stop means adapted to be projected to hold back other elongated articles on the bed until the first mentioned elongated article has moved past the limiting means and means connected and operable consonantly with said means for moving the limiting means relatively to the guideway controlling the extent of projection of the stop means in relation to the transverse dimension of the elongated articles being handled so that the greater such transverse dimension the farther the stop means will be projected.

3. Mechanism for handling elongated articles comprising an inclined bed, a guideway along the low side of the bed toward which elongated articles on the inclined bed tend to gravitate, limiting means operatively interposed between the inclined bed and the guideway limiting the extent to which the elongated articles can gravitate toward the guideway, means for moving the limiting means relatively to the guideway to properly position the limiting means in relation to the transverse dimension of the elongated articles being handled so that the greater such transverse dimension the closer to the guideway the limiting means will be, means adapted to act on an elongated article next the limiting means to move the elongated article past the limiting means into the guideway, stop means adapted to be projected to hold back other elongated articles on the bed until the first mentioned elongated article has moved past the limiting means, means controlling the extent of projection of the stop means in relation to the transverse dimension of the elongated articles being handled so that the greater such transverse dimension the farther the stop means will be projected, and means including a single common control element for controlling the means for moving the limiting means relatively to the guideway and the means determining the extent of projection of the stop means.

References Cited in the file of this patent

UNITED STATES PATENTS

| | | |
|---|---|---|
| 1,450,226 | Rebstock | Apr. 3, 1923 |
| 1,508,369 | Johnson | Sept. 9, 1924 |
| 1,700,697 | Draper | Jan. 29, 1929 |
| 2,057,131 | Barton | Oct. 13, 1936 |
| 2,115,762 | Bohn | May 3, 1938 |
| 2,751,781 | McConnell | June 26, 1956 |
| 2,763,236 | Cummings | Sept. 18, 1956 |